(12) United States Patent
Bhattacharyya et al.

(10) Patent No.: US 8,306,329 B2
(45) Date of Patent: Nov. 6, 2012

(54) SYSTEM AND METHOD FOR SEARCHING HANDWRITTEN TEXTS

(75) Inventors: Chiranjib Bhattacharyya, Karnataka (IN); Sriraghavendra Ramaswamy, Tamilnadu (IN)

(73) Assignee: Indian Institute of Science, Karnataka (IN)

( * ) Notice: Subject to any disclaimer, the term of this patent is extended or adjusted under 35 U.S.C. 154(b) by 361 days.

(21) Appl. No.: 12/618,239

(22) Filed: Nov. 13, 2009

(65) Prior Publication Data

US 2011/0038543 A1    Feb. 17, 2011

(30) Foreign Application Priority Data

Aug. 17, 2009   (IN) .......................... 1947/CHE/2009

(51) Int. Cl.
    *G06K 9/00*    (2006.01)
(52) U.S. Cl. .......................... 382/187; 382/181; 382/186
(52) U.S. Cl. ................
(58) Field of Classification Search ........................ None
    See application file for complete search history.

(56) References Cited

U.S. PATENT DOCUMENTS

| | | | | |
|---|---|---|---|---|
| 5,687,254 A | * | 11/1997 | Poon et al. | 382/229 |
| 5,832,474 A | * | 11/1998 | Lopresti et al. | 1/1 |
| 2005/0286771 A1 | * | 12/2005 | Bishop et al. | 382/202 |

FOREIGN PATENT DOCUMENTS

EP   0686931   12/1995

OTHER PUBLICATIONS

Sriraghavendra, R., et al., "Frechet Distance based Approach for Searching Online Handwritten Documents," Ninth International Conference on Document Analysis and Recognition (ICDAR 2007), Sep. 23-26, 2007, vol. I, pp. 461-465 [online], [retrieved on Jan. 7, 2011]. Retrieved from the Internet <URL: http://nineye.net/blog/wp-content/uploads/2009/02/frechet_distance_based_approach_for.pdf>.
International Search Report for PCT/IB2010/053606 mailed Jan. 13, 2011.
Durbin, R., et al., "Biological Sequence Analysis: Probabilistic Models of Proteins and Nucleic Acids," Cambridge University Press, 1998, pp. 1-24.

* cited by examiner

*Primary Examiner* — Chan S Park
*Assistant Examiner* — Elisa Rice
(74) *Attorney, Agent, or Firm* — Brundidge & Stanger, P.C.

(57) ABSTRACT

A language-neutral method for searching online handwritten notes is provided. The different algorithms contained in this method enable querying online multilingual handwritten documents with substrings of words rather than just whole words. More particularly, two approaches are presented—one based on partial Fréchet distance calculations and the other based on a pair hidden Markov models. The partial Fréchet distance is adapted from the traditional Fréchet distance concept to match a subcurve or prefix of a query word. The pair hidden Markov model used in the present application is adapted from pair hidden Markov models used in bioinformatics as generative models of local and global alignment of biological sequences.

20 Claims, 8 Drawing Sheets

SYSTEM AND METHOD FOR SEARCHING HANDWRITTEN TEXTS

CROSS REFERENCE TO RELATED APPLICATIONS

This application claims priority to Indian Patent Application Serial No. 1947/CHE/2009 filed Aug. 17, 2009, the contents of which are incorporated by reference herein in its entirety.

BACKGROUND

In the last decade, there has been a tremendous increase in the popularity and widespread use of mobile devices. Although mobile devices and PDAs support touch sensitive screens that are naturally suited for handwritten input, keypads continue to be the primary input interface. Current handwriting recognition technologies are not yet reliable enough for most users. Text recognition is particularly lacking for written languages with complex character sets.

More recently, the use of digital ink, which is the storing of raw handwritten data directly without performing text recognition, has been gaining in popularity. Use of digital ink opens the possibility of forgoing the need for text recognition altogether and simply operating and accessing stored handwritten notes in their raw format. The usability of handwritten digital ink documents written in can be greatly increased if previously handwritten documents can be searched.

SUMMARY

In one embodiment, a method for searching handwritten notes comprises storing a handwritten note in a bivariate time format; receiving a handwritten query note in the bivariate time format; generating finite sequences based on pair hidden Markov models using a portion of the handwritten note and a portion of the handwritten query note; providing a joint probability distribution based on the finite sequences; calculating a similarity score based on the joint probability distribution; and comparing the similarity score against a criterion.

In another embodiment, the method further comprises wherein the similarity score is based on the highest probability value in the joint probability distribution.

In another embodiment, the method further comprises wherein a highest probability value in the joint probability distribution is acquired using a Viterbi algorithm.

In one embodiment, a method for searching handwritten notes comprises storing an array of handwritten notes in a bivariate time format; receiving a handwritten query note in the bivariate time format; calculating a similarity score for each handwritten note in the array of handwritten notes by generating finite sequences based on pair hidden Markov models using a portion of each handwritten note in the array and a portion of the query note, and acquiring a highest probability value from a joint probability distribution of the finite sequences; comparing each similarity score against a criterion; and generating an array of similar handwritten notes comprising handwritten notes with corresponding similarity scores that meet the criteria.

In another embodiment, the method further comprises wherein acquiring highest probability values from a joint probability distribution of the finite sequences is achieved using a Viterbi algorithm.

In another embodiment, the method further comprises segmenting the handwritten notes based on a distance threshold.

In another embodiment, the method further comprises rescaling the handwritten notes and the handwritten query note to having matching heights before calculating a similarity score.

In another embodiment, the method further comprises wherein calculating a similarity score accounts for variations in the start points and positions of the handwritten notes and the handwritten query note.

In one embodiment, an apparatus for searching handwritten notes comprises a stored array of handwritten notes in a bivariate time format; an interface for receiving a handwritten query note in the bivariate time format; and a processor for calculating an array of similarity scores, and outputting an array of similar handwritten notes, wherein each similarity score in the array of similarity scores corresponds to a handwritten note in the stored array of handwritten notes, wherein each similarity score is calculated by generating finite sequences based on pair hidden Markov models using a portion of the corresponding handwritten note in the array and a portion of the query note, and acquiring a highest probability value from a joint probability distribution of the finite sequences, and wherein the array of similar handwritten notes comprises handwritten notes with corresponding similarity scores that meet a criterion.

In one embodiment, the apparatus further comprises wherein the highest probability value from the joint probability distribution of the finite sequences is acquired using a Viterbi algorithm.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The embodiments will be further elucidated by means of the following description and the appended drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The present application is directed to a system and method for searching handwritten notes, with the capability of searching for notes written in any language, drawings, and other free-form symbols. Accordingly, the term handwritten note(s) in the following description may refer to any written language, drawings or various free-form symbols.

Figure 1:
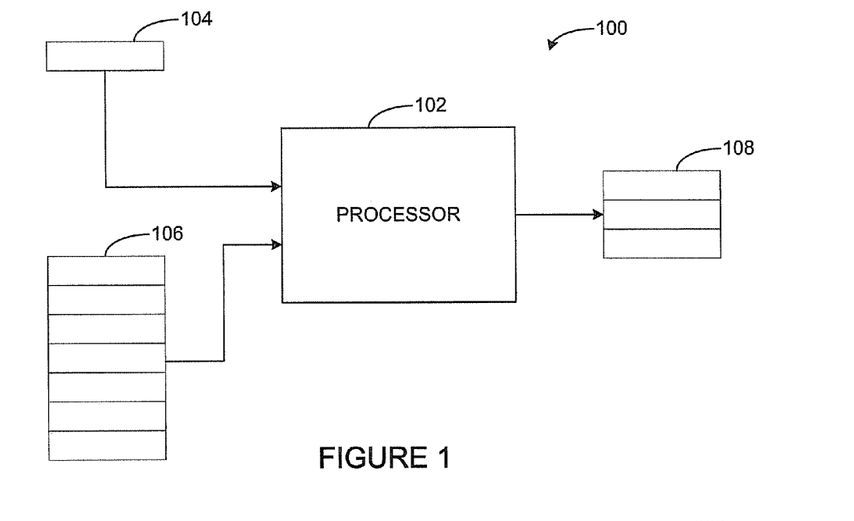
FIG. 1 is a block diagram of a device for searching handwritten notes.

FIG. 1 is a block diagram of a device 100 for searching handwritten notes, including a processor 102, a query note 104, a set of stored handwritten notes 106, and a set of matching handwritten notes 108. The set of stored handwritten notes 106 is an array of handwritten notes inputted by a user previously. The query note 104 is handwritten by the user when the user wishes to search for handwritten notes similar to the query note 104 among the set of stored handwritten notes 106. The processor 102 receives the query note 104 from the user, searches among the set of stored handwritten notes 105, and outputs the set of matching handwritten notes 108, which is an array that contains handwritten notes from the set of stored handwritten notes 106 considered similar to the query note 104, based on algorithms executed by the processor 102.

In an embodiment of the present application, the notes in the set of stored handwritten notes 106 are stored in a bivariate time format. Similarly, the query note 104 is also received in a bivariate time format. Algorithms executed by the processor 102 may accordingly determine whether the query note 104 and a handwritten note from the set of stored handwritten notes 106 are similar using the bivariate time information of the notes as inputs.

Data in bivariate time format may include two variables and a time value. The two variables can be standard x and y Cartesian coordinates, or magnitude and angle values. The time value can alternatively be any set of values that define the order or sequence of the two variables.

Figure 2:
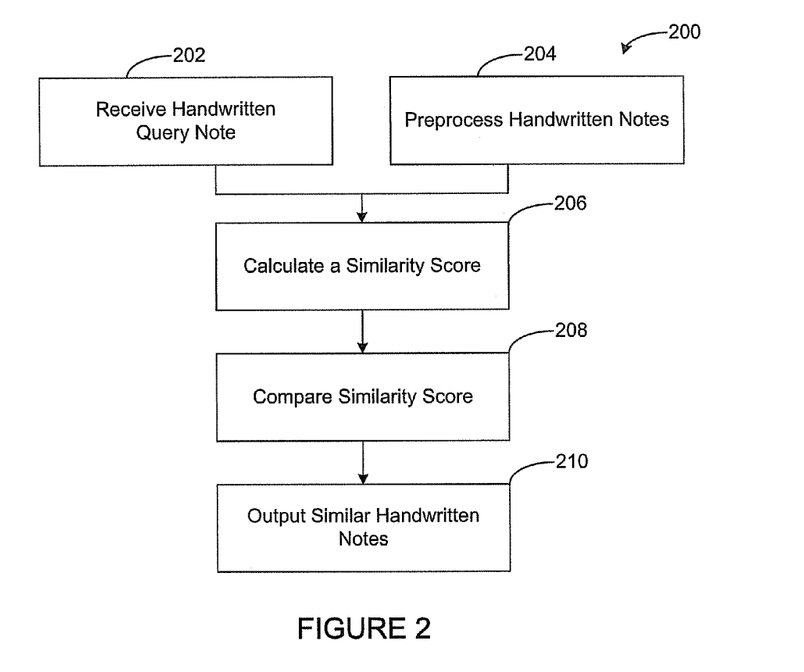
FIG. 2 is a flow diagram showing steps for handwritten notes searching that may be executed by the processor in FIG. 1.

FIG. 2 is a flow diagram 200 showing the steps of a handwritten notes searching device, including a Receive Handwritten Query Note step 202, a Preprocess Handwritten Notes step 204, a Calculate Similarity Score Step 206, a Compare Similarity Score step 208, and an Output Similar Handwritten Notes step 210.

The Receive Handwritten Query Note step 202 is analogous to the processor 102 receiving the query note 104 as shown in the block diagram of FIG. 1, involving the device receiving a handwritten note that the user wishes to search for. The handwritten query note can be received from the user drawing on a pad using a stylus, wherein the pad can be a generic touch pad or a touch screen interface. The handwritten query note can also be received through various computer pointing devices. In an embodiment of the present application, the handwritten query note itself is received in a bivariate time format.

The Preprocess Handwritten Notes step 204 involves the segmenting and/or parsing of handwritten notes which are to be searched to match the query note. Because the handwritten notes may have been received as a series of symbols (sentences), segmenting the handwritten notes to be searched into individual segments (words) allows searching of the individual segments.

To segment the series of symbols, an algorithm can be employed to identify indices of the bivariate time series where the split distance is greater than a particular threshold. The split distance $d_s$, of a time series at an index i, is defined as:

$$d_s = \min_{j>i}(x_j) - \max_{j \leq i}(x_j)$$

where $x_j$ is the x-coordinate corresponding to index j of the time series.

The Preprocess Handwritten Notes step 204 may also involve normalizing the coordinates and rescaling of the handwritten notes. Normalizing the coordinates may be necessary due to variations in starting positions between handwritten notes and the query note, as well as among the handwritten notes. This may be achieved by defining a starting coordinate and a handwritten note baseline based on the average coordinate values of a handwritten note. Similarly, rescaling of the handwritten notes may be necessary due to variations in sizes in the handwritten notes. This may be achieved by rescaling all handwritten notes to a constant height. These preprocessing steps as well as other operations may be utilized to improve handwritten note searching.

The Calculate Similarity Score step 206 involves providing a quantitative comparison between the query note and each of the preprocessed handwritten notes. In an embodiment of the present application, similarity scores can be calculated based on the bivariate time series information of the query note and the handwritten notes. There are a number of ways for calculating similarity scores. A few examples of these methods, as well as examples of similarity score calculations and related quantitative comparisons are further herein below with respect to FIGS. 3-7.

The Compare Similarity Score step 208 compares the respective similarity scores between the query note and each of the preprocessed handwritten notes against a criterion to determine which of the preprocessed handwritten notes may be what the user is looking for. How the criterion is set may depend on how the similarity scores are calculated. For example, if the similarity score is calculated based on how similar two curves are, then the criterion may be set as a minimum similarity value such that only the preprocessed handwritten notes with a similarity score above a certain value is added to an output array. For example, if the similarity score is based on a similarity percentage, then an example criterion may be that only the preprocessed handwritten notes with similarity score above 80% are added to the output array.

On the other hand, if the similarity score is calculated based on how different two curves are, then the criterion may be set as a maximum similarity value such that only the preprocessed handwritten notes with a similarity score below a certain value is added to the output array. For example, if the similarity score is based on a scalar difference between two polygonal curves, then an example criterion may be that only the preprocessed handwritten notes with similarity score below 15 units are added to the output array.

The criterion may also be set as threshold based on a similarity ranking In this case, the preprocessed handwritten notes may be ranked according to their similarity scores and only the preprocessed handwritten notes with similarity scores within a certain ranking are added to the output array. For example, an example criterion may be that only the top 50 most similar preprocessed handwritten notes are added to the output array regardless of their similarity scores.

Further, a criterion based on the combination of similarity score as well as ranking may be implemented, such that only the handwritten notes within a certain ranking that also have similarity scores above or below a certain value are added to the output array. For example, the top 50 most similar preprocessed handwritten notes are added to the output array if their similarity score is also below 15 units.

The Output Similar Handwritten Notes step 210 outputs the handwritten notes that have been determined to be similar to the query word based on the criterion. The similar handwritten notes may be presented to the user either as they are found in the form of an instantly updated display of the updated array as new similar notes are found, or as a complete array once all the hand written notes have been searched and have been compared against a criterion.

As mentioned earlier, there are a number of ways for calculating similarity scores. Two methods for calculating the similarity scores are presented below—the Fréchet distance method, and the pair hidden Markov model (PHMM).

The Fréchet distance between two curves is the longest distance between a point from one curve and a point on the other curve with the same corresponding time value. Given that $D_1, D_2, D_3, \ldots, D_m$ denote the Euclidean distances between the corresponding points of two curves each having m points, the Fréchet distance can be represented by $\max(D_1, D_2, D_3, \ldots, D_m)$. For the application of handwritten notes searching, a partial Fréchet distance (PFD) calculation focusing on the matching of a curve to a subcurve may be implemented. The following examples of partial Fréchet distance calculations are compared against calculations based on partial dynamic time warping (PDTW), a distance measure concept used for sequential pattern matching. The PDTW distance can be represented as $(D_1^2+D_2^2+D_3^2+\ldots+D_m^2)^{1/2}$. Shift-invariant versions of PFD and PDTW calculations are also presented.

FIGS. 3a-3d illustrates an example of finding the best alignment between a curve Q and a curve P using both PFD and PDTW calculations. Curve P 302 includes points p1, p2 and p3, while Curve Q 304 includes points q1, q2, q3, q4, q5 and q6. Dash lines represent the curve P, solid lines represent the curve Q, and dotted lines represent the distance values between a point in curve P and a corresponding point in curve Q depending on the alignment. All possible monotonic alignments between the curve P and subcurves of curve Q are considered. For each alignment, the distances PFD(Q, P) and PDTW(Q,P) are calculated, and the subcurve of curve Q that results in the shortest alignment distance is considered to be the closest alignment match to the curve P. The shortest alignment distance can then be considered as a representative quantitative comparison or similarity score between the curve Q and the curve P.

Figure 3A:
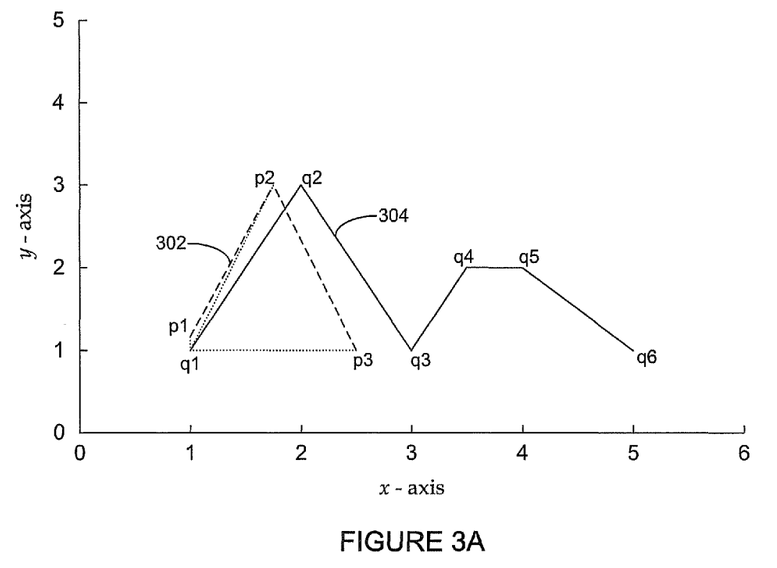
FIG. 3a is an example of PFD and PDTW calculations based on a first possible alignment between a curve P and a subcurve of curve Q.

FIG. 3a is an example of PFD and PDTW calculations based on a first possible alignment between a curve P and a subcurve of curve Q. In this example, the curve P is aligned to a subcurve of curve Q consisting of just the single point q1. The distances between the points p1, p2, p3 in curve P and the point q1 in the subcurve of curve Q are 0.2, 2.136 and 1.5 respectively. Accordingly, PFD(Q, P)=max(0.2, 2.136, 1.5)= 2.136, and PDTW(Q, P)=$(0.2^2+2.136^2+1.5_2)^{1/2}$=2.6177.

Figure 3B:
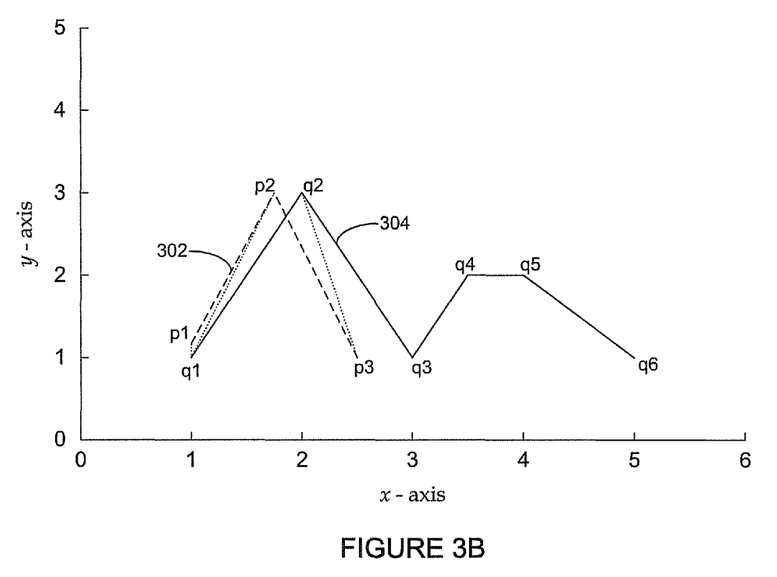
FIG. 3b is an example of PFD and PDTW calculations based on a second possible alignment between a curve P and a subcurve of curve Q.

FIG. 3b is an example of PFD and PDTW calculations based on a second possible alignment between a curve P and a subcurve of curve Q. In this example, the curve P is aligned to a subcurve of curve Q consisting of the points q1 and q2, having aligned matched pair of points (p1, q1), (p2, q1) and (p3, q2). Their respective distances are 0.2, 2.136 and 2.062 respectively. Accordingly, PDF(Q,P)=max(0.2, 2.136, 2.062)=2.136, and PDTW(Q,P)=$(0.2^2+2.136^2+2.062^2)^{1/2}$=2.975.

Figure 3C:
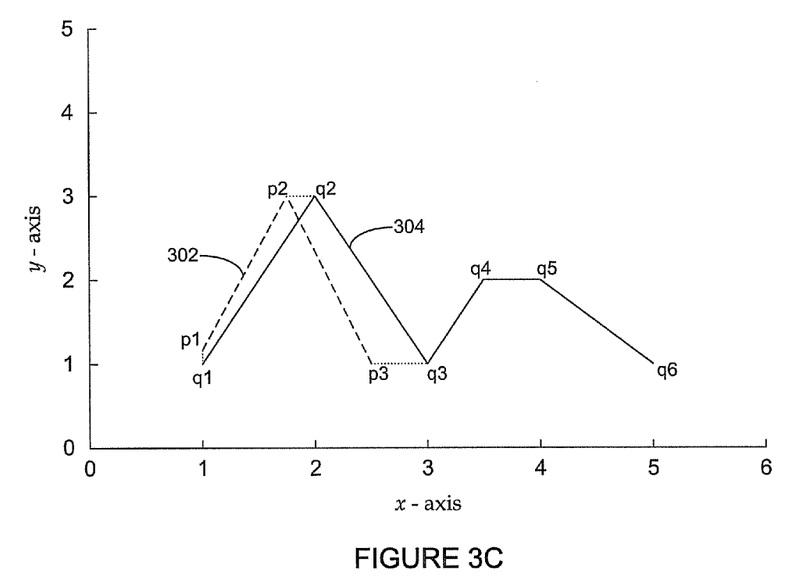
FIG. 3c is an example of PFD and PDTW calculations based on a third possible alignment between a curve P and a subcurve of curve Q.

FIG. 3c is an example of PFD and PDTW calculations based on a third possible alignment between a curve P and a subcurve of curve Q. In this example, the curve P is aligned to a subcurve of curve Q consisting of the points q1, q2 and q3, having aligned matched pair of points (p1, q1), (p2, q2) and (p3, q3). Their respective distances are 0.2, 0.25 and 0.5 respectively. Accordingly, PDF(Q,P)=max(0.2, 0.25, 0.5)=0.5, and PDTW(Q,P)=$(0.2^2+0.25^2+0.5^2)^{1/2}$=0.5937.

Figure 3D:
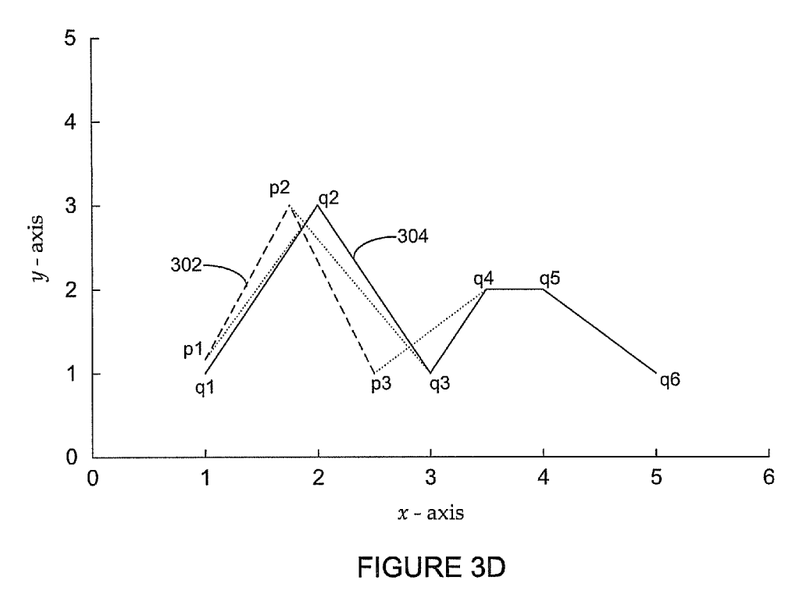
FIG. 3d is an example of PFD and PDTW calculations based on a fourth possible alignment between a curve P and a subcurve of curve Q.

FIG. 3d is an example of PFD and PDTW calculations based on a fourth possible alignment between a curve P and a subcurve of curve Q. In this example, the curve P is aligned to a subcurve of curve Q consisting of the points q2, q3 and q4, having aligned matched pair of points (p1, q2), (p2, q3) and (p3, q4). Their respective distances are 2.059, 2.358 and 1.414 respectively. Accordingly, PDF(Q,P)=max(2.059, 2.358, 1.414)=2.358, and PDTW(Q,P)=$(2.059^2+2.358^2+1.414_2)^{1/2}$=3.435.

In addition to the alignments discussed in FIGS. 3a-d, the PFD and PDTW calculations for all other possible monotonic alignments between P and subcurves of the curve Q are performed and considered. The resulting shortest alignment distance, which is to be considered as a representative quantitative comparison or similarity score between the curve Q and the curve P is represented by min(2.136, 2.136, 0.5, 2.358, . . . )=0.5 for PFD, and min(2.6177, 2.975, 0.5937, 3.435, . . . )=0.5937 for PDTW. As such, it has been shown that the alignment shown in FIG. 3c of subcurve points q1, q2, and q3 provided the shortest alignment distances for both PFD and PDTW, and is therefore the closest match to the curve P.

Figure 4A:
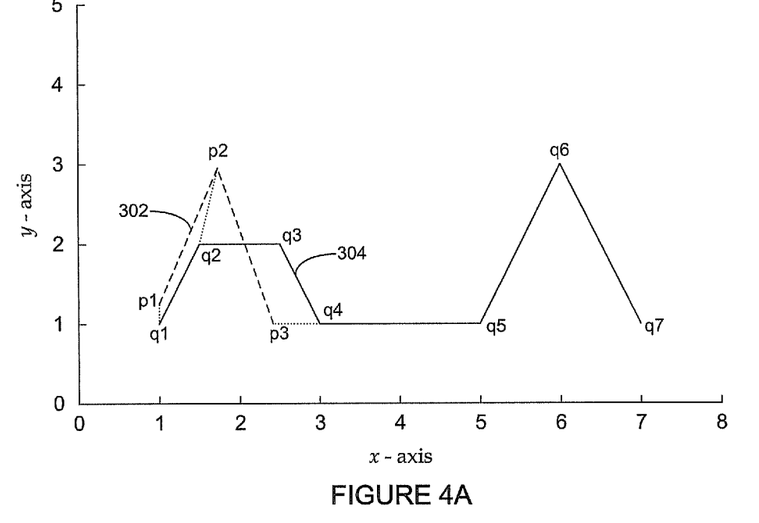
FIG. 4a is an example of shift-affected PFD and PDTW calculations based on a first possible alignment between a curve P and a subcurve of curve Q.
Figure 4B:
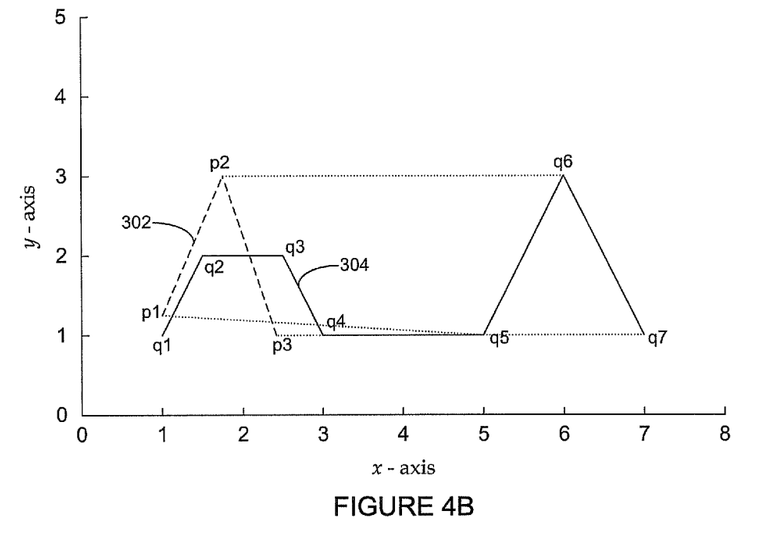
FIG. 4b is an example of shift-affected PFD and PDTW calculations based on a second possible alignment between a curve P and a subcurve of curve Q.

FIGS. 4a and 4b illustrate an example situation in which shifts and/or translations of handwritten notes affect the results of the search, as mentioned briefly above. As shown in FIG. 4b, it can be seen that the subcurve of the curve Q that best matches the curve P consist of the points q5, q6 and q7. However, both PFD and PDTW calculations return that the subcurve of Q consisting of the points q1, q2, q3 and q4 is the best match as illustrated in FIG. 4a. To overcome a situation such as depicted in FIGS. 4a-4b, PFD and PDTW calculations can be performed for all possible monotonic alignments between all possible subcurves of the curve Q and all possible displacement shifted versions of the curve P. In other words, the curve P can be shifted horizontally and/or vertically across an incremented range, and PDF and PDTW calculations are made at each incremented shift. The minimum values from all the outputs of these calculations can then be used as the representative quantitative comparison or similarity score between the curve Q and the curve P.

Figure 5A:
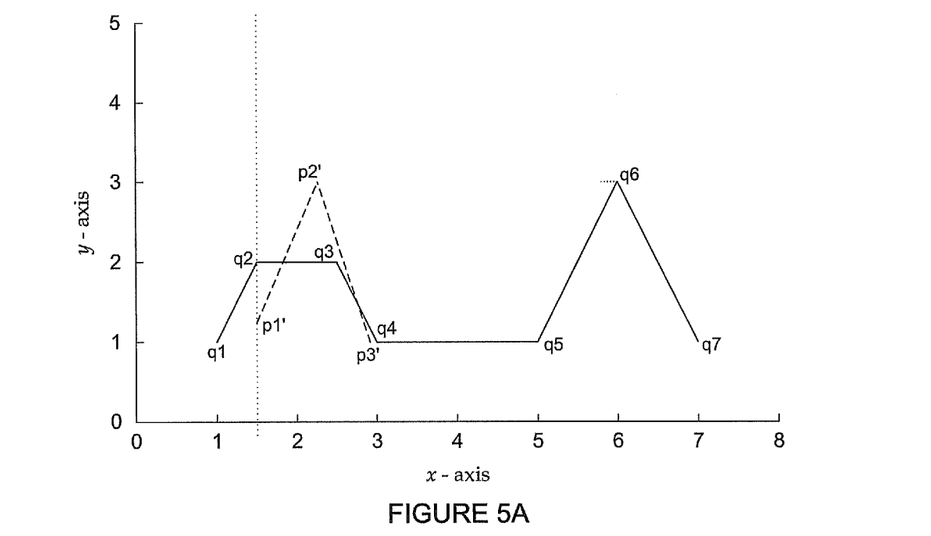
FIG. 5a is an example of a possible displacement shifted version of the curve P, denoted P'.

In one embodiment, the increment for each shift is the horizontal or vertical distance between a point and its successive point in the curve. For example, FIG. 5a shows a horizontal displacement shifted version of the curve P, denoted as P'. P' is shifted horizontally along the x-axis such that the point p1 has the same x-axis value as the point q2, which is the successive point of q1 in the curve Q. In this case, the increment for the shift is given as $$x_{shift} = x_{q2} - x_{q1} = x_{q2} - x_{p1}.$$

Accordingly, $$x_{p1'} = x_{p1} + x_{shift},$$

$$x_{p2'} = x_{p2} + x_{shift}, \ldots, \text{ and}$$

$$x_{pm'} = x_{pm} + x_{shift}.$$

Since there is no vertical shift in this example, $y_{p1'} = y_{p1}$. In the case that there is a vertical shift along the y-axis, similar calculations can be done to generate different monotonic alignments between the curves. In another embodiment, the increment for each shift can be any constant or dynamically computed value appropriate for the application and computing ability of the device.

Figure 5B:
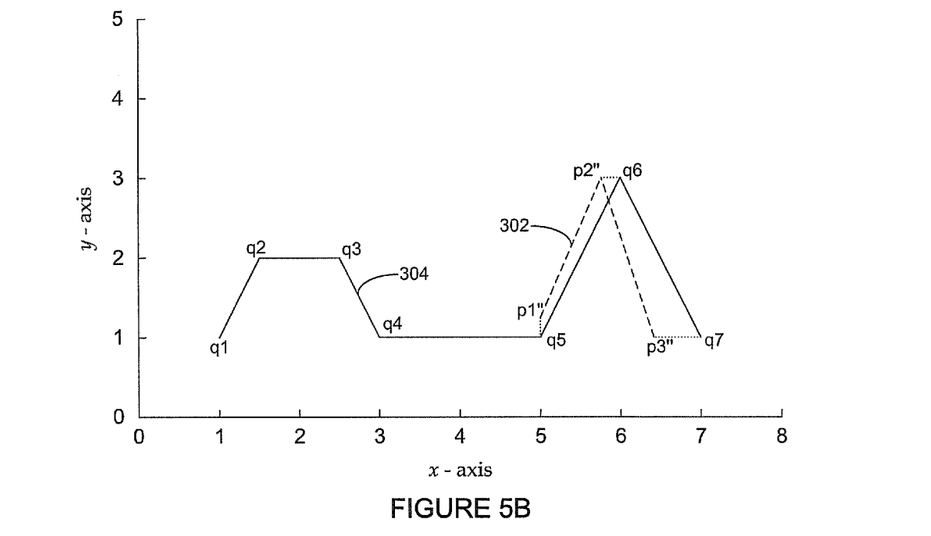
FIG. 5b is an example of shift-invariant PFD and PDTW calculations based on a possible alignment between a curve P and a subcurve of curve Q, denoted as P''.

FIG. 5b shows a displacement shifted version of the curve P, denoted as P''. P'' is shifted along the x-axis such that the point p1'' has the same x-axis value as the point q5. Performing PFD and PDTW calculations for all possible monotonic alignments between all possible subcurves of the curve Q and all possible displacement shifted versions of the curve P returns the subcurve of the curve Q consisting of points q5, q6 and q7 to be the best match for the curve P.

Another shift-invariant solution to the issue of shifts and/or translations of handwritten notes is to use height and angle variables. The height variable y denotes the height of each sample point of the curve and the angle variable θ denotes the counterclockwise angle between the x-axis and the slope of the tangent to the curve at a given sample point. Given a curve P=(p1, p2, . . . , p$_m$) in the x-y coordinate system, where p$_i$=(x$_i$, y$_i$), the equivalent curve P$_{y,\theta}$=(p1', p2', . . . , p'$_m$) can be obtained using the following computations:

$$y'_i = y_i - y_{min}$$

wherein y$_{min}$ is the y-coordinate of the bottommost point of the curve P, and $$\theta_i = \tan^{-1}((y_{i+1} - y_i)/(x_{i+1} - x_i))$$

for i=1, 2, . . . , m−1. Since there is no succeeding point p$_{m+1}$ for the terminal point p$_m$, θ$_m$ is defined to be 0. Accordingly, the PFD$_{y,\theta}$ between the two curves P and Q is defined as PFD$_{y,\theta}$(P, Q)=PFD(P', Q'). In other words, instead of using the x-y coordinate system values, the curves P and Q are converted to equivalent curves P' and Q' in the y-θ system before PFD calculations between P' and Q'. The y-θ variant of PDTW is analogously defined as PDTW$_{y,\theta}$(P, Q)=PDTW(P', Q').

Figure 6A:
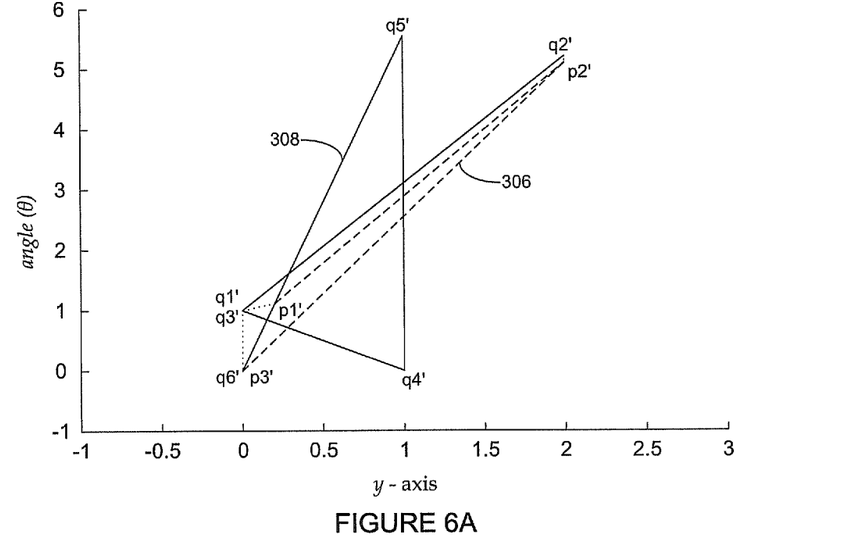
FIG. 6a is an example of alternative shift-invariant PFD and PDTW calculations based on a first possible alignment between a curve P and a subcurve of curve Q.
Figure 6B:
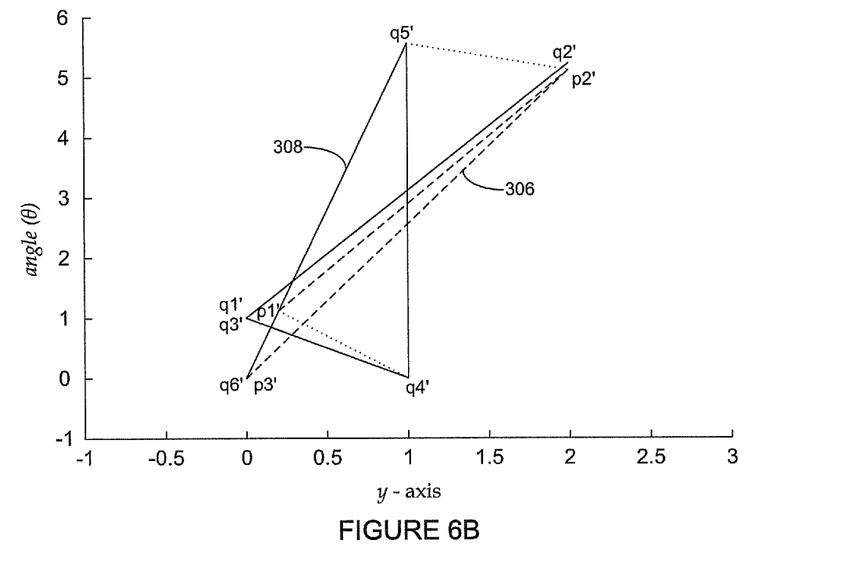
FIG. 6b is an example of alternative shift-invariant PFD and PDTW calculations based on a first possible alignment between a curve P and a subcurve of curve Q.

FIGS. 6a and 6b illustrate the distances between matched pair of points of the curve P' 306 and subcurves of the curve Q' 308 corresponding to the curve P and subcurves of the curve Q, respectively from FIGS. 3a to 3d. FIG. 6a shows the alignment between the curve P' and the subcurve of the curve Q' consisting of the points q1', q2' and q3', analogous to the curve P and subcurve of the curve Q in FIG. 3c. In this case, q1' actually coincides with q3'. FIG. 6b shows the alignment between the curve P' and the subcurve of the curve Q' consisting of the points q4', q5' and q6'. Based on calculations, the alignment with the subcurve of the curve Q consisting of the points q1', q2' and q3' gives the minimum alignment distance for both PFD$_{y,\theta}$ and PDTW$_{y,\theta}$ calculations. Hence the subcurve of the curve Q' consisting of the points q1', q2' and q3' is the closest match to P'. Since the subcurve of the curve Q' with points q1', q2' and q3' is the y-θ system equivalent of subcurve of the curve Q with points q1, q2 and q3 as shown in FIG. 3c, it has been shown that the results of the shift-invariant PFD$_{y,\theta}$ and PDTW$_{y,\theta}$ calculations is consistent with the standard. PFD and PDTW calculations.

In addition to the PFD calculations presented in the present application and the currently used PDTW calculations, the concept of pair hidden Markov models (PHMM) can also be implemented for searching handwritten notes by providing joint probability distributions over two polygonal curves. PHMM models a system of two sequences, each with hidden states, and generates a conditional probability distribution of the hidden states based on the visible states. In other words, a PHMM can determine the probability that the curve P matches approximately with a particular subcurve of the curve Q via a particular curve alignment. As such, using PHMM for partial searching of handwritten notes has the advantage of being able to account for random variations in a user's handwriting and drawings.

Figure 7:
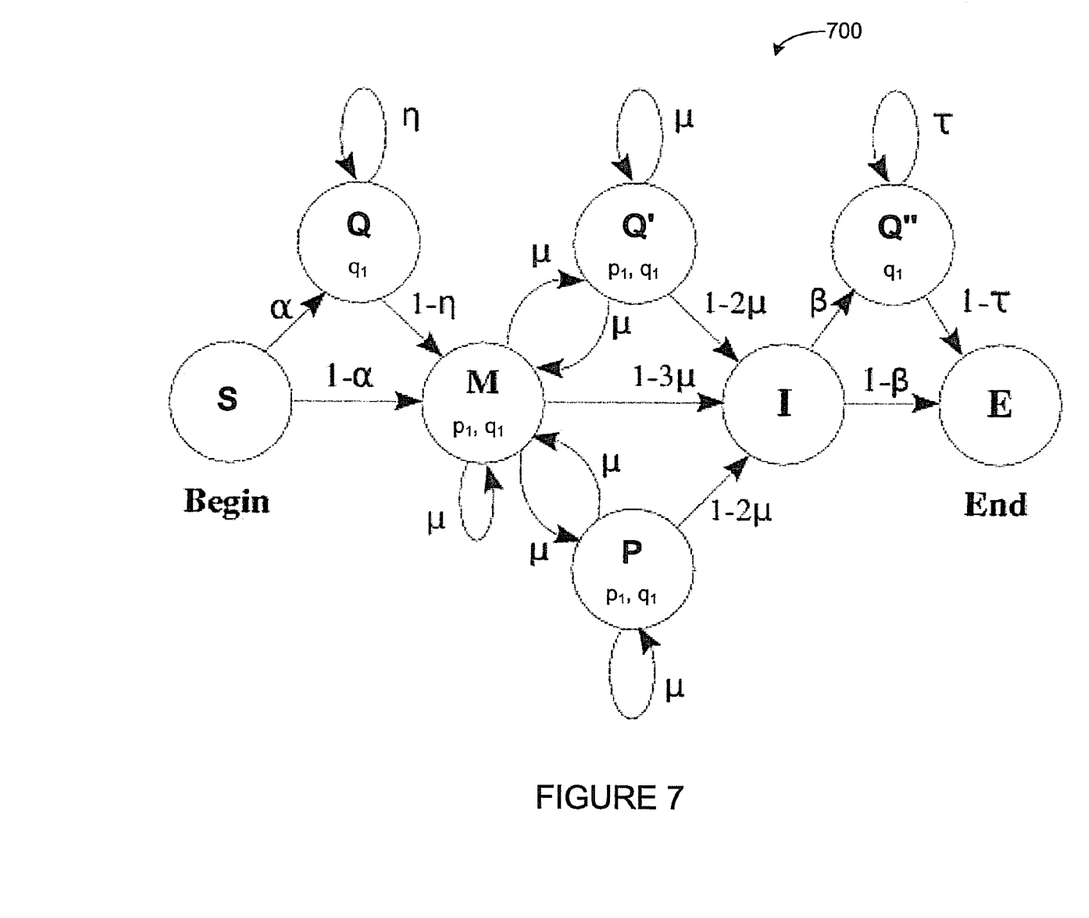
FIG. 7 is a pair hidden Markov model for providing a joint probability distribution over alignments between a pair of finite length polygonal curves P and Q.

FIG. 7 shows a PHMM 700 that can provide a joint probability distribution over alignments between a pair of finite length polygonal curves P and Q. The PHMM 700 comprises states S, M, I, E, P, P', P'' and Q, beginning in the state S, and ending in the state E. The state M corresponds to when the bivariate time data points on both the curve P and the curve Q are advancing along the curve. The state Q corresponds to when the bivariate time data point on the curve Q is advancing, but the bivariate time data point on the curve P is stationary. Analogously, the state P corresponds to when the bivariate time data point on the curve P is advancing, but the bivariate time data point on the curve Q is stationary. The states Q' and Q'' respectively generate the initial and terminating portions of Q that are not aligned with P. The values α, β, η, μ, and τ represent the transition probabilities.

Given the probability distribution provided by the PHMM 700 shown in FIG. 7, the Viterbi algorithm can be used to derive the most probable alignment between the curve Q and the curve P, based on an alignment score. To demonstrate this method, the same curve Q and curve P from FIGS. 3a to 3d are transformed into the height y and angle θ system, as previously shown in FIGS. 6a and 6b, respectively. Again, FIG. 6a corresponds to the alignment shown in FIG. 3c, and FIG. 6b shows the alignment between the curve P' and the subcurve of the curve Q' consisting of the points q4', q5' and q6'.

In the alignment shown in FIG. 3c and represented in FIG. 6a, curve P is aligned to a subcurve of curve Q consisting of the points q1', q2' and q3', having aligned matched pair of points (p1', q1'), (p2', q2') and (p3', q3'). As such, the points q4', q5' and q6' are unaligned. The corresponding sequence of state transitions, based on the PHMM 700 is as follows: S→M→M→M→Q''→Q''→Q''→I→E. Defining g(p$_i$', q$_j$') as the emissions probability of an alignment (p$_i$', q$_j$'), the alignment score can be given as:

$$(1-\alpha) \cdot g(p_1', q_1') \cdot \mu \cdot g(p_2', q_2') \cdot \mu \cdot g(p_3', q_3') \cdot (1-3\mu) \cdot \beta \cdot \tau \cdot \tau \cdot (1-\tau),$$

which can simplified as:

$$(1-\alpha) \cdot \mu^2 \cdot (1-3\mu) \cdot \beta \cdot \tau^2 \cdot (1-\tau) \cdot g(p_1', q_1') \cdot g(p_2', q_2') \cdot g(p_3', q_3').$$

In one embodiment, the emissions probability can be defined as:

$$g(p_i', q_j') = \gamma \cdot e^{-\gamma \cdot D(p_i', q_j')}$$

where $D(p_i', q_j')$ can be the Euclidean distance between the points $p_i'$ and $q_j'$.
Accordingly, the above equation becomes:

$$(1-\alpha) \cdot \mu^2 \cdot (1-3\mu) \cdot \beta \cdot \tau^2 \cdot (1-\tau) \cdot \gamma^3 \cdot e^{-\gamma \cdot (D(p_1', q_1') + D(p_2', q_2') + D(p_3', q_3'))}$$

In the alignment represented in FIG. 6b, curve P is aligned to a subcurve of curve Q consisting of the points q4', q5' and q6', having aligned matched pair of points (p1', q4'), (p2', q4') and (p3', q6'). The corresponding sequence of state transitions, based on the PHMM 700 is as follows: S→Q'→Q'→Q'→M→M→M→I→E. The alignment score is accordingly:

$$\alpha \cdot \eta \cdot \eta \cdot (1-\eta) \cdot g(p_1', q_4') \cdot \mu \cdot g(p_2', p_5') \cdot \mu \cdot g(q_3', p_6') \cdot (1-3\mu) \cdot (1-\beta) = \alpha \cdot \eta^2 \cdot (1-\eta) \cdot \mu^2 \cdot (1-3\mu) \cdot (1-\beta) \cdot \gamma^3 \cdot e^{-\gamma \cdot (D(p_1', q_4') + D(p_2 40, q5') + D(p_3', q6'))}$$

The values for transition probabilities in a PHMM system, such as $\alpha$, $\beta$, $\gamma$, $\eta$, $\tau$ and $\mu$ of the PHMM 700 shown in FIG. 7, can be chosen heuristically based on experiments. Example values may be: $\alpha = \beta = \eta = \tau = 0.5$, $\mu = 0.25$, $\gamma = 1$. Using these transition probabilities, the alignment score of the alignment represented in FIG. 6a becomes:

$$(0.5) \cdot (0.0625) \cdot (0.25) \cdot (0.5) \cdot (0.25) \cdot (0.5) \cdot e^{-(D(p1', q1') + D(p2', q2') - D(p3', q3'))} = 0.00048828125 \cdot e^{-(D(p1', q1') + D(p2', q2') + D(p3', q3'))}$$

Similarly, the alignment score of the alignment represented in FIG. 6b becomes:

$$(0.5) \cdot (0.25) \cdot (0.5) \cdot (0.0625) \cdot (0.25) \cdot (0.5) \cdot e^{-D(p1', q4') + D(p2', q5') + D(p3', q6'))} = 0.00048828125 \cdot e^{-D(p1', q4') + D(p2', q5') + D(p3', q6'))}$$

Further, by substituting the values of distances $D(p1', q1')$, $D(p2', q2')$ and $D(p3', q3')$, the alignment score of the alignment represented in FIG. 6a becomes:

$$0.00048828125 \, e^{-(0.224 + 0.1 + 1)} = 0.00048828125 \cdot 0.2661 = 0.0001299165$$

Similarly, by substituting the values of the distances $D(p_1', q_4')$, $D(p_2', q_5')$ and $D(p_3', q_6')$, the alignment score of the alignment represented in FIG. 6a becomes:

$$0.00048828125 \, e^{-(1.36 + 1.118 + 0)} = 0.00048828125 \cdot 0.08391 = 0.0000409721$$

Based on theses alignment scores, the alignment represented in FIG. 6a appears to be a better alignment than the alignment represented in FIG. 6b. Calculations similar to what has been show for the alignments represented in FIGS. 6a and 6b can be performed for other alignments as well to find the best alignment between curve P and the subcurve of the curve Q.

Analogous to the PFD and PDTW methods of finding the shortest distance of all the possible alignments and using that particular distance as the representative quantitative comparison of the query note and handwritten note, the probability associated with the most probably alignment based on a PHMM model can be used as the representative quantitative comparison and applied against a specific criterion.

Figure 8:
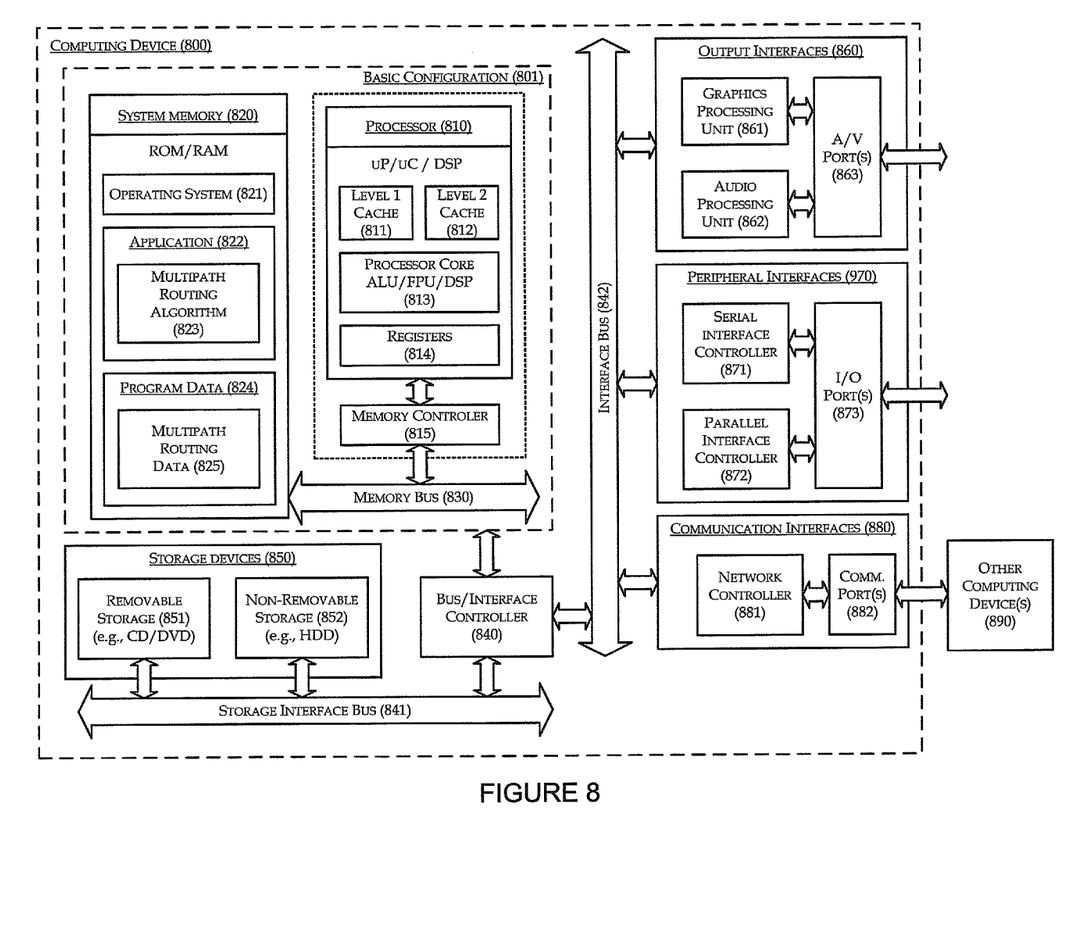
FIG. 8 is a block diagram illustrating an example computing device arranged for handwritten notes searches.

FIG. 8 is a block diagram illustrating an example computing device 800 that is arranged for searching handwritten notes. In a very basic configuration 801, computing device 800 typically includes one or more processors 810 and system memory 820. A memory bus 830 can be used for communicating between the processor 810 and the system memory 820.

Depending on the desired configuration, processor 810 can be of any type including but not limited to a microprocessor (µP), a microcontroller (µC), a digital signal processor (DSP), or any combination thereof Processor 810 can include one more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof System memory 820 typically includes an operating system 821, one or more applications 822, and program data 824. Application 822 includes distance or probability calculation algorithm 823 that is arranged to determine a quantitative comparison between a query note and a previously handwritten note. Program Data 824 includes multipath routing data 825 that is useful for calculating distances or probabilities, as will be further described below. In some example embodiments, application 822 can be arranged to operate with program data 824 on an operating system 821 such that previously handwritten notes can be searched according to a user input query note. This described basic configuration is illustrated in FIG. 8 by those components within dashed line 801.

Computing device 800 can have additional features or functionality, and additional interfaces to facilitate communications between the basic configuration 801 and any required devices and interfaces. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include an interface bus 842 for facilitating communication from various interface devices (e.g., output interfaces, peripheral interfaces, and communication interfaces) to the basic configuration 801 via the bus/interface controller 840. Example output interfaces 860 include a graphics processing unit 861 and an audio processing unit 862, which can be configured to communicate to various external devices such as a display or speakers via one or more A/V ports 863. Example peripheral interfaces 860 include a serial interface controller 871 or a parallel interface controller 872, which can be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which can be arranged to facilitate communications with one or more other computing devices 890 over a network communication via one or more communication ports 882. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for searching handwritten notes comprising:
storing a handwritten note in a bivariate time format;
receiving a handwritten query note in the bivariate time format;
comparing the bivariate time format handwritten note with the bivariate time format handwritten query note by generating finite sequences based on pair hidden Markov models using a portion of the handwritten note and a portion of the handwritten query note;
calculating a similarity score based on the comparison; and
comparing the similarity score against a criterion.

2. The method of claim 1, wherein comparing the bivariate time format handwritten note with the bivariate time format handwritten query note comprises providing a joint probability distribution based on the finite sequences; and wherein calculating a similarity score based on the comparison further comprises calculating the similarity score based on the joint probability distribution.

3. The method of claim 2, wherein the similarity score is based on the highest probability value in the joint probability distribution.

4. The method of claim 3, wherein a highest probability value in the joint probability distribution is acquired using a Viterbi algorithm.

5. The method of claim 1, wherein comparing the bivariate time format handwritten note with the bivariate time format handwritten query note comprises calculating an array of distance values between each point from one of the handwritten note and the handwritten query note, and each point from a subcurve of the other of the handwritten note and the handwritten query note, for each possible monotonic alignment between the points from one of the handwritten note and the handwritten query note, and the subcurve of the other of the handwritten note and the handwritten query note.

6. The method of claim 5, wherein the maximum value from each array of distance values is used as an alignment score for the corresponding monotonic alignment.

7. The method of claim 6, wherein the minimum alignment score is used as the similarity score between the handwritten note and the handwritten query note.

8. A method for searching handwritten notes comprising:
storing an array of handwritten notes in a bivariate time format;
receiving a handwritten query note in the bivariate time format;
calculating a similarity score for each handwritten note in the array of handwritten notes by generating finite sequences based on pair hidden Markov models using a portion of each handwritten note in the array and a portion of the query note;
comparing each similarity score against a criterion; and
generating an array of similar handwritten notes comprising handwritten notes with corresponding similarity scores that meet the criterion.

9. The method of claim 8 wherein calculating the similarity score for each handwritten note in the array of handwritten notes comprises acquiring a highest probability value from a joint probability distribution of the finite sequences.

10. The method of claim 9, wherein acquiring the highest probability value from the joint probability distribution of the finite sequences is achieved using a Viterbi algorithm.

11. The method of claim 9 further comprising segmenting the handwritten notes based on a distance threshold.

12. The method of claim 9 further comprising rescaling the handwritten notes and the handwritten query note to having matching heights before calculating the similarity score.

13. The method of claim 9 wherein calculating the similarity score accounts for variations in the start points and positions of the handwritten notes and the handwritten query note.

14. The method of claim 8, wherein calculating the similarity score for each handwritten note in the array of handwritten notes comprises calculating an array of distance values between each point from a subcurve of each handwritten note and each point from a subcurve of the handwritten query note for each possible monotonic alignment between the subcurve of each handwritten note and the subcurve of the handwritten query note.

15. The method of claim 14, wherein the maximum value from each array of distance values is used as an alignment score for the corresponding monotonic alignment.

16. The method of claim 15, wherein the minimum alignment score is used as the similarity score between the handwritten note and the handwritten query note.

17. An apparatus for searching handwritten notes comprising:
a stored array of handwritten notes in a bivariate time format;
an interface configured to receive a handwritten query note in the bivariate time format; and
a processor configured to calculate an array of similarity scores by generating finite sequences based on pair hidden Markov models using a portion of the corresponding handwritten note in the array and a portion of the query note, and configured to output an array of similar handwritten notes, wherein each similarity score in the array of similarity scores corresponds to a handwritten note in the stored array of handwritten notes, and wherein the array of similar handwritten notes comprises handwritten notes with corresponding similarity scores that meet a criterion.

18. The apparatus of claim 17, wherein each similarity score is calculated by acquiring a highest probability value from a joint probability distribution of the finite sequences.

19. The apparatus of claim 18, wherein the highest probability value from the joint probability distribution of the finite sequences is acquired using a Viterbi algorithm.

20. The apparatus of claim 17, wherein each similarity score is calculated based on the Fréchet distance between a portion of the corresponding handwritten note in the array and a portion of the query note.

* * * * *

UNITED STATES PATENT AND TRADEMARK OFFICE
CERTIFICATE OF CORRECTION

PATENT NO. : 8,306,329 B2
APPLICATION NO. : 12/618239
DATED : November 6, 2012
INVENTOR(S) : Bhattacharyya et al.

It is certified that error appears in the above-identified patent and that said Letters Patent is hereby corrected as shown below:

In the Drawings

In Fig. 8, Sheet 8 of 8, delete "UP/UC" and insert -- $\mu P/\mu C$ --, therefor.

In Fig. 8, Sheet 8 of 8, in Box (815), in Line 1, delete "MEMORY CONTROLER" and insert -- MEMORY CONTROLLER --, therefor.

In the Specifications

In Column 5, Line 14, delete "ranking" and insert -- ranking. --, therefor.

In Column 6, Line 12, delete "$1.5_2)^{1/2}$=2.6177." and insert -- $1.5^2)^{1/2}$=2.6177. --, therefor.

In Column 6, Line 38, delete "$1.414_2)^{1/2}$=3.435." and insert -- $1.414^2)^{1/2}$=3.435. --, therefor.

In Column 6, Line 45, delete "min(2.136, 2.136," and insert -- min(2.136, --, therefor.

In Column 9, Lines 18-20, delete

"$\alpha \cdot \eta \cdot \eta \cdot (1-\eta) \cdot g(p_1', q_4') \cdot \mu \cdot g(p_2', p_5') \cdot \mu \cdot g(q_3', p_6') \cdot (1-3\mu) \cdot (1-\beta) = \alpha \cdot \eta^2 \cdot (1-\eta) \cdot \mu^2 \cdot (1-3\mu) \cdot (1-\beta) \cdot \gamma^3 \cdot e^{-\gamma \cdot (D(p1', q4') + D(p240, q5') + D(p3', q6'))}$"

Signed and Sealed this
Thirtieth Day of April, 2013

Teresa Stanek Rea
*Acting Director of the United States Patent and Trademark Office*

CERTIFICATE OF CORRECTION (continued)
U.S. Pat. No. 8,306,329 B2 and insert $$\alpha \cdot \eta \cdot \eta \cdot (1-\eta) \cdot g(p_1',q_4') \cdot \mu \cdot g(p_2',p_5') \cdot \mu \cdot g(q_3',p_6') \cdot (1-3\mu) \cdot (1-\beta)$$

$$= \alpha \cdot \eta^2 \cdot (1-\eta) \cdot \mu^2 \cdot (1-3\mu) \cdot (1-\beta) \cdot \gamma^3 \cdot e^{-\gamma \cdot (D(p_1',q_4') - D(p_2',q_5') - D(p_3',q_6'))}.$$

-- --,
therefor.

In Column 9, Lines 33-35, delete

"$$(0.5) \cdot (0.25) \cdot (0.5) \cdot (0.0625) \cdot (0.25) \cdot (0.5) \cdot e^{-D(p1', q4') + D(p2', q5') + D(p3', q6'))} =$$
$$0.00048828125 \cdot e^{-D(p1', q4') + D(p2', q5') + D(p3', q6'))}.$$"

and insert $$(0.5) \cdot (0.25) \cdot (0.5) \cdot (0.0625) \cdot (0.25) \cdot (0.5) \cdot e^{-(D(p_1',q_4') - D(p_2',q_5') + D(p_3',q_6'))}$$
$$= 0.00048828125 \cdot e^{-(D(p_1',q_4') - D(p_2',q_5') + D(p_3',q_6'))}.$$

-- --,
therefor.

In Column 10, Line 4, delete "thereof" and insert -- thereof. --, therefor.